April 29, 1947.  R. A. PETERSON  2,419,854
BOMB
Filed Sept. 27, 1941  7 Sheets-Sheet 1

Fig. 1.

Inventor
Richard A. Peterson
By Williams, Bradbury & Hinkle
Attys.

April 29, 1947. R. A. PETERSON 2,419,854
BOMB
Filed Sept. 27, 1941 7 Sheets-Sheet 2

Fig. 5.

April 29, 1947.    R. A. PETERSON    2,419,854
BOMB
Filed Sept. 27, 1941    7 Sheets-Sheet 7

Fig. 8.

Inventor
Richard A. Peterson
BY
Williams, Bradbury & Hinkle
Atty's

Patented Apr. 29, 1947

2,419,854

UNITED STATES PATENT OFFICE 2,419,854

BOMB

Richard A. Peterson, Chicago, Ill.

Application September 27, 1941, Serial No. 412,535

1 Claim. (Cl. 102—2)

The present invention relates to bombs and more particularly to bombs of the type adapted to be dropped from aircraft.

In general, bombs of the type to which the present invention is particularly applicable are known as fragmentation bombs, that is, bombs of the type in which a metal casing is disintegrated by an explosive charge and the principal effectiveness of the bomb is due to flying metal fragments. In the past, bombs of the fragmentation type have been in general restricted to use against personnel.

It is an object of the present invention to increase the effectiveness of fragmentation type bombs, principally by increasing the effective radius of fragmentation bombs.

A further object of the present invention is to provide an improved bomb particularly adaptable for use by aircraft for bombing other aircraft.

Still another object of the present invention is to provide what may be termed an anti-aircraft bomb having means to enable the destruction of an aircraft by the bomb without the necessity of hitting the attacked aircraft with the bomb.

Still another object is to provide a novel anti-aircraft bomb having means to explode the bomb after the bomb has dropped a predetermined distance.

Still another object of the present invention is to provide a novel anti-aircraft bomb having an effective radius considerably larger than bombs of equal size heretofore used.

Still another object of the present invention is to provide a contact type fragmentation bomb having an effective radius considerably larger than contact fragmentation bombs of similar size heretofore used.

Yet another object of the present invention is to provide a bomb having novel timed fuse mechanism together with novel means for instituting operation of the fuse timing mechanism simultaneously with the release of the bomb.

Still another object of the present invention is to provide a novel bomb of the fragmentation type having a large effective radius and in which the fragments are well distributed within the effective radius.

Still another object of the present invention is to provide a novel bomb which fires a plurality of small timed fragmentation type explosive projectiles and which fragments the bomb case subsequent to the firing of these projectiles.

Still another object of the present invention is to provide an explosive projectile adapted to be fired from a bomb by an explosive charge within the bomb.

Still another object of the present invention is to provide a shrapnel-type time bomb.

A further object is to provide a novel shrapnel time bomb in which the pellets are given a generally downward as well as a scattering component.

A further object of the present invention is to provide a novel fragmentation type contact bomb in which the fragments are given an upward as well as an outward component.

Still another object of the present invention is to provide a novel shrapnel bomb having means for increasing the velocity of the shrapnel pellets.

Yet another object of the present invention is to provide a novel bomb time fuse.

Yet another object of the present invention is to provide an improved bomb release particularly adapted for use with timed bombs of the type mentioned.

Other objects and advantages will become apparent from the following description of several alternative embodiments of my invention taken in conjunction with the accompanying drawings in which.

Figure 1:
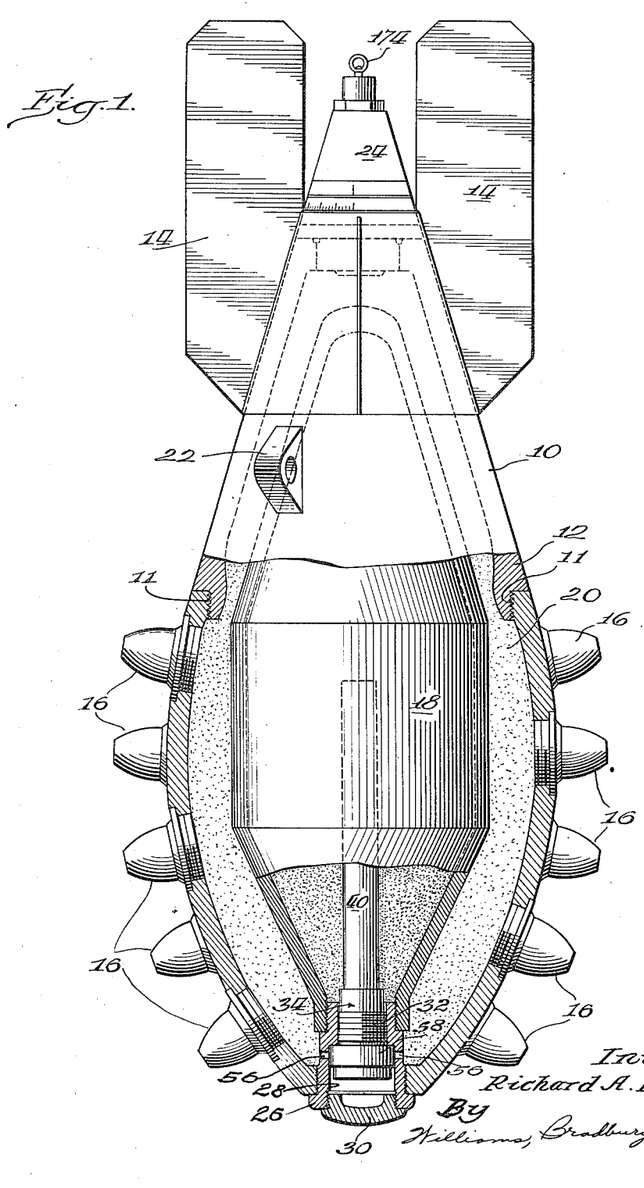
Fig. 1 is a side view of an anti-aircraft bomb embodying one form of the present invention with a portion of the case broken away to show the internal structure and mechanism.
Figure 2:
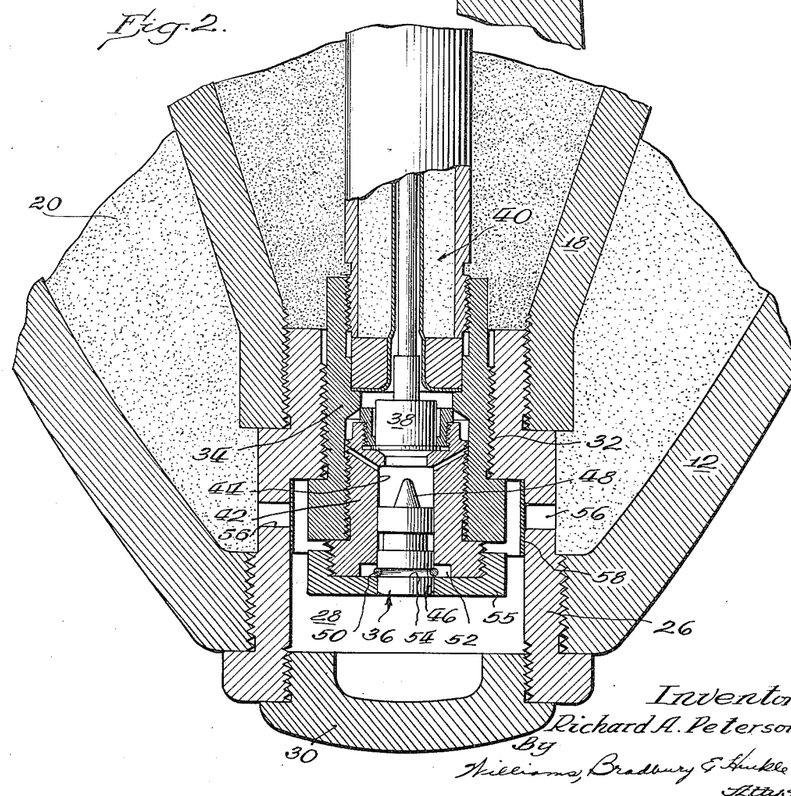
Fig. 2 is an enlarged sectional view of the nose end of the bomb shown in Fig. 1.
Figure 3:
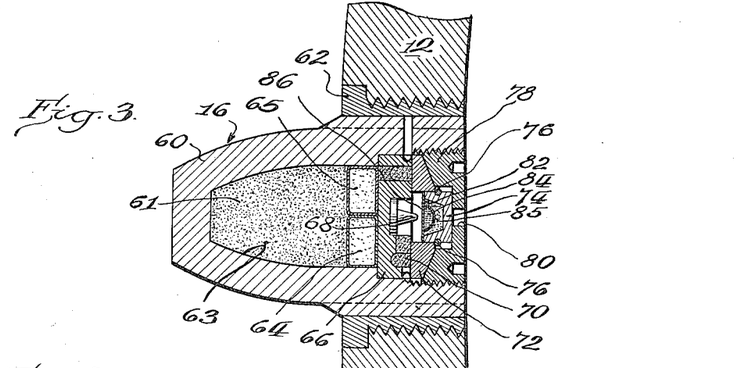
Fig. 3 is an enlarged sectional view through one of the bomb projectiles and a portion of the adjacent case.

Referring particularly to Figs. 1, 2 and 3, the bomb there shown and indicated generally by the numeral 10 comprises a metal casing 12 formed as upper and lower halves joined by threads 11 and fitted at its rearward end with guiding fins 14. This bomb case has a multiplicity of openings therethrough, each of which contains the rearward end of an explosive projectile 16. These projectiles are shown in greater detail in Fig. 3. Within the outer casing 12 the bomb contains a second smaller casing 18 supported generally in axial alignment with the outer casing, the space between these casings being filled with an explosive charge 20. This explosive charge 20 may be of any suitable type having a comparatively slow rate of propagation, such as gun powder, for instance. The inner casing 18 is filled with a high explosive, such as TNT for instance. Although these two explosives have been specifically mentioned, it will be appreciated that other explosives will serve the purpose and will readily suggest themselves to one skilled in the art. This bomb may be suspended from a bomb release rack of the type shown in Fig. 7 by means of ears 22, one of which is shown in Fig. 1.

The rearward end of the bomb case 12 is internally threaded to receive a time fuse 24. As will be explained more fully subsequently in connection with the description of the bomb shown in Fig. 4, this fuse when actuated ignites a primer and a variable length powder train by means of which the explosive charge 20 can be ignited a predetermined interval of time after the actuation of the primer.

The nose end of the bomb is internally threaded to receive an annular adaptor ring 26 which extends inwardly and at its inward end is internally threaded into the lower end of the inner casing 18, thereby providing support for this inner casing.

The adaptor ring 26 is provided with a comparatively large recess 28 at its nose end which is closed by a threaded cap 30 when the bomb is assembled for use. At the inner end of the recess 28 an internal threaded bore extends through the adaptor ring and communicates with the interior of the casing 18. These threads indicated by the numeral 32 support a second adaptor 34 which contains a fuse 36, a primer detonator 38 and a booster 40. The primer detonator 38 may be of any standard type and the one shown may be considered as the Mk. IIB 0.1 second delay primer detonator. The booster 40 may also be of a standard type and the one shown may be considered as booster Mk. D. The booster Mk. D and the primer detonator Mk. IIB referred to above are explained in greater detail in the United States War Department Bulletin, Technical Regulations No. 1370-G, entitled "Miscellaneous ammunition—Bombs for aircraft". Because these boosters and primer detonators are well known to those familiar with the art, no detail descriptions of these elements need be given here, it being sufficient to state that the adaptor ring 34 supports the lower end of the booster 40, which extends upwardly into the explosive charge within the casing 18.

The primer detonator 38 is supported with its head in a position below the booster 40 and has its detonator case extending upwardly into the detonator socket within the explosive charge in the booster 40. A retaining member 42 is threaded into the recess in the adaptor 34 and retains the primer detonator in place. A cylindrical recess 44 extends inwardly through the retainer 42 and at its inner end communicates with the head of the primer detonator 38. A piston 46 is mounted to slide within this cylindrical recess and is provided at its inner end with a firing pin 48 in alignment with the primer cap in the head of the primer detonator 38. Until the bomb is to be exploded, the piston 46 is retained in an outward position with the firing pin 48 well away from the primer by means of a split ring 50. This ring is located within an annular recess 52 near the outer end of the adaptor 42 and embraces an annular groove 54 in the side of the piston 46, thus preventing axial movement of the piston until sufficient pressure has been brought to bear against the head of the piston to spring the ring 50 out of the groove 54. Outward movement of the piston 46 is prevented by an annular cap 55 threaded to the retainer 42.

A plurality of holes 56 extend through the sidewalls of the adaptor 26 and communicate with the recess 28 at their inner ends and with the annular space between the shells 12 and 18 at their outer ends. The inner ends of these openings 56 are closed off from the recess 28 by means of an annular thin metal sleeve 58 pressed into place within the recess 28. This sleeve 58 prevents the powder confined within the space between the shells 12 and 18 from sifting into the annular chamber 28.

With this construction it will be appreciated that after the fuse 24 fires the low velocity powder charge, the explosive force of this charge will expel the projectiles 16 from the bomb case and will simultaneously collapse the sleeve 58, thus admitting gas pressure to the chamber 28. This gas pressure spreads the ring 50 and drives the piston inwardly, thus causing the firing pin 48 to fire the primer detonator 38. This in turn causes firing of the booster charge which in turn fires the high velocity explosive charge within the casing 18. The detonation of this charge fragments both the inner bomb case 18 and the outer bomb case 12, thereby filling the air in the vicinity of the exploding bomb with metal fragments.

Each of the projectiles 16 is comprised of a metal casing 60, the rearward end of which is generally cylindrical and is press fitted into a soft metal ring 62; this metal ring being in turn threaded into openings in the bomb case 12. It will be seen, therefore, that the explosion of the powder charge confined between the shells 12 and 18 will force these projectiles out of the soft metal rings 62 and shoot them away from the bomb at relatively high velocity. The case 60 contains a recess 63 filled with a high explosive bursting charge against which is placed a booster charge 64 and a detonator charge 65. These latter charges are confined within cases and are held in place by a disc 66 which carries a rearwardly projecting firing pin 68 upon its rearward face. The space surrounding this pin communicates with one end of a circuitous compressed powder timing train 70 contained within a C-shaped time train groove in the disc 66. The opposite end of the compressed powder timing train is positioned adjacent the detonator charge 65.

The disc 66 is retained in place by an annular member 72 having a cylindrical opening therethrough within which a cup-shaped piston 74 is freely slidable. This piston 74 is normally retained in its outward position by means of a split ring 76 in the same manner that the piston 46 is normally retained in an outward position by the split ring 50. Outward movement of the cup-shaped piston 74 is prevented by an annular retaining ring 78 threaded into the rearward end of the projectile case 60 and provided with a small aperture 80 which extends axially therethrough so as to communicate between the interior of the bomb case 12 and the head of the piston 74. The cup-shape piston 74 has a recess 82 in its inner face which contains a quantity of mercury fulminate or other primer charge 84 and a small quantity of gun powder 85. The inner end of this piston 74 is covered by a thin metal diaphragm 86 which insures that the primer charge 84 and powder 85 will be confined within the recess 82.

When the powder charge between the shells 12 and 18 explodes and the resulting gas pressure expels the projectiles 60, this gas pressure acting through the opening 80 will also drive the piston 74 forwardly against the pin 68, thus deforming or fracturing the thin metal plate 86 and firing the primer charge 84 and powder 85. This in turn ignites the powder timing train 70 which, after a predetermined interval, fires the detonator 65 and booster 64 and finally the high explosive charge 61. By means of this arrangement the projectile 60 can be caused to explode at a timed interval after the explosion of the powder within the shells 12 and 18. In ordinary use, the time delay interval selected for the timing train 70 will be so chosen that the projectile 60 will explode in a zone outside of the zone filled with fragments by the bursting charge within the shell 18. It will be seen therefore that a bomb embodying the present invention will destroy or disable an airplane a considerable distance from the point at which the bomb explodes and that an airplane armed with bombs embodying this invention will be a highly effective weapon for defense against attacking bombers.

Figure 4:
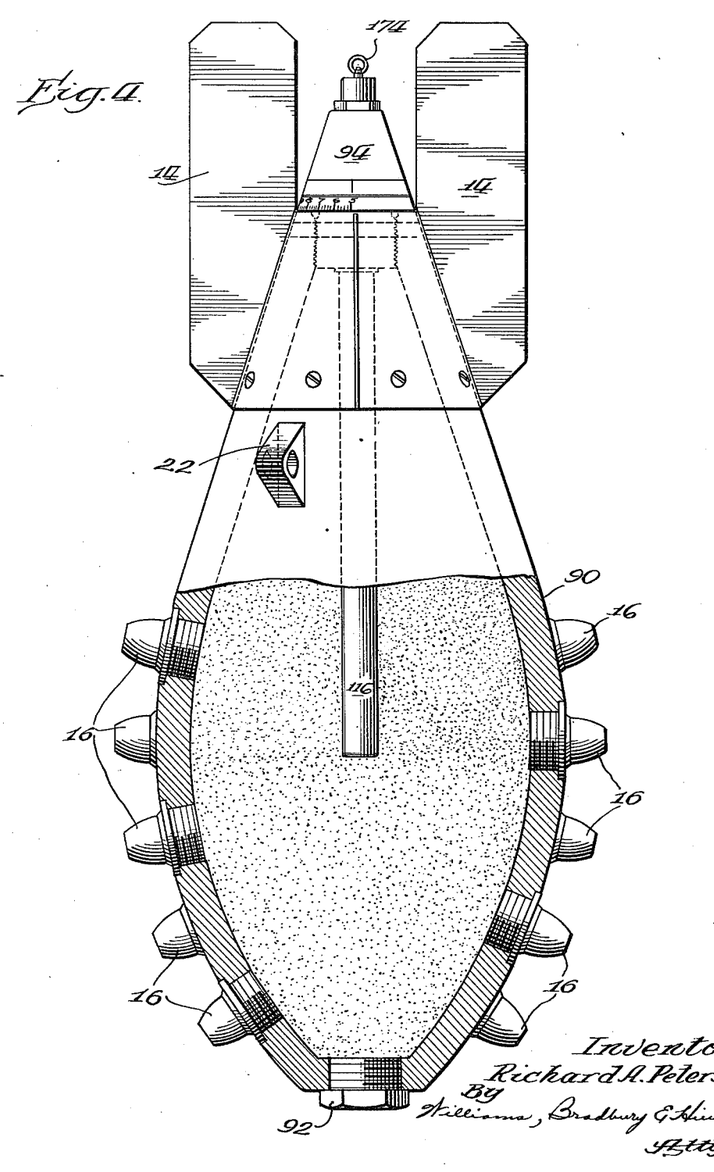
Fig. 4 is a modified anti-aircraft bomb similar to the bomb shown in Figs. 1 to 3. The bomb in Fig. 4, however, is of somewhat simpler construction and operates in a somewhat different manner.

The bomb shown in Fig. 4 is generally similar to the one shown in Figs. 1 to 3. It has no inner casing similar to that indicated by the numeral 18 in Fig. 1.

More specifically, the bomb illustrated in Fig. 4 comprises a body or casing 90, the nose end of which is adapted to be closed by a threaded plug 92. The body can be similar to the casing 12 in that it is provided with numerous projectiles 16 which may be identical with those shown in Fig. 1. The casing 90 need not be made in two pieces however since no central casing is located therein. At its upper end the bomb is provided with fins 14 and a time fuse 94.

Figure 5:
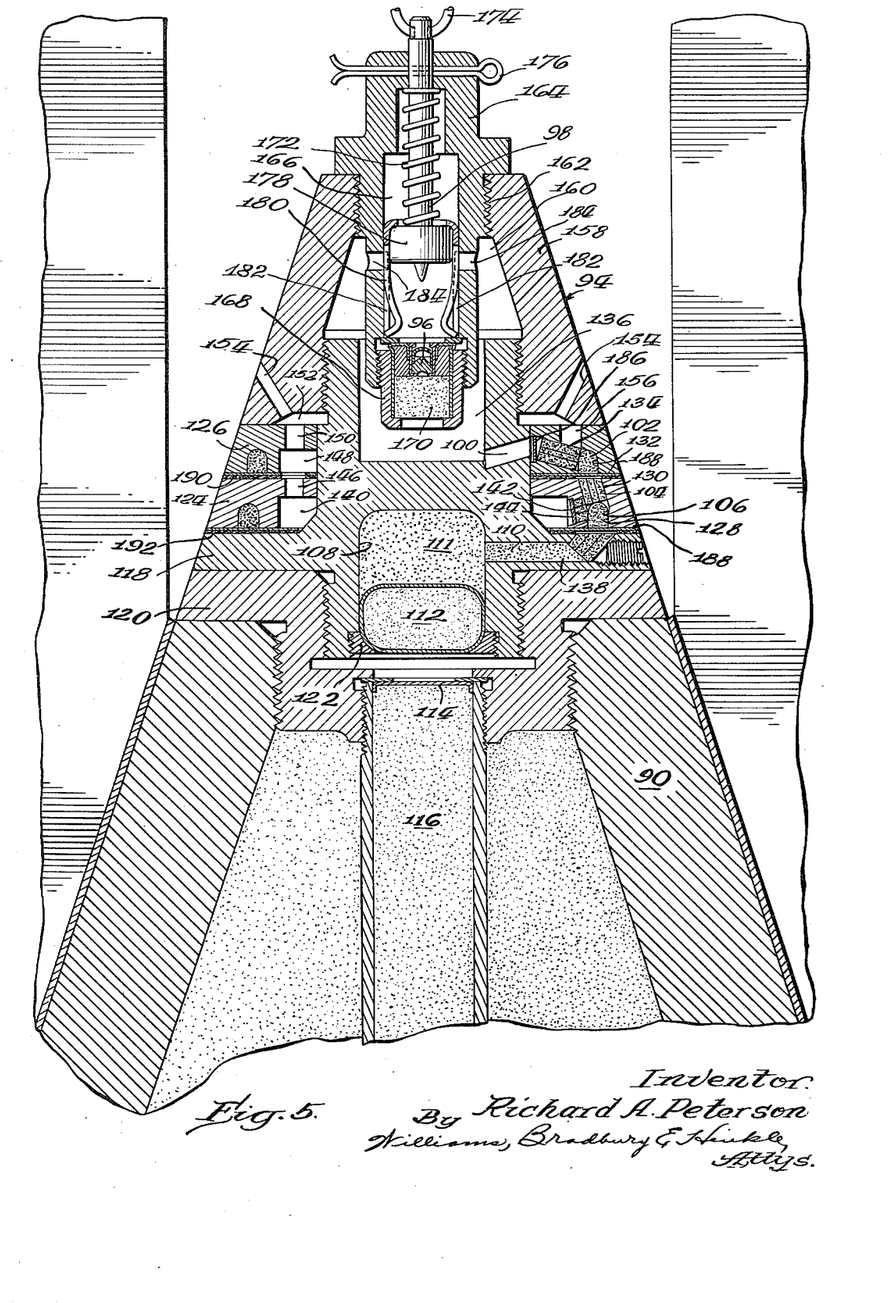
Fig. 5 is a vertical medial sectional view on an enlarged scale through the upper portion of the bomb shown in Fig. 4. When modified in a manner to be described subsequently, Fig. 5 may be considered as a sectional view through the upper portion of the bomb shown in Fig. 1.

The fuse 94 is shown in greater detail in Fig. 5. It contains a primer 96 adapted to be fired by a spring actuated firing pin 98. Upon ignition of the primer, which may be of any suitable type such as the shot-gun head type shown, the flame communicates by way of a compressed powder pellet in a passage 100 with an upper powder train ring 102. After burning around the upper powder ring for a predetermined distance, the flame is communicated through a port 104 with a lower powder ring 106 and from this powder ring to a central chamber 108 by way of compressed powder in a passage 110. The central chamber 108 contains primer and detonator charges 111 and 112 respectively and the latter when ignited bursts through a thin disc 114 and detonates a booster charge 116 contained within a relatively long tube which extends well downwardly within the bomb casing 90. This booster in turn propagates the detonating wave to an explosive charge which completely fills the interior of the bomb casing. The explosion of this last-mentioned charge projects the projectiles 16 in the same manner that the charge within the annular chamber between the shells 12 and 18 expels the projectile shown in Fig. 1. The firing of the charge within the bomb case also fragments the case. It will be appreciated that since the same explosive charge is used to expel the projectiles 16 and to fragment the bomb case, this explosive charge cannot be of the extremely high velocity type such as may be used in the inner casing 18 shown in Fig. 1. It must be chosen with the design of the particular bomb in mind and should be of as high a velocity as can be obtained without the danger of fragmentation or preignition of the projectiles 16.

The fuse 94 is shown in greater detail in Fig. 5 and includes a body member 118 threaded into an adaptor 120 which in turn is threaded into the upper opening in the bomb case. The lower end of this adaptor 120 is attached to the upper end of the booster tube, while a recess 108 in the lower end of the body portion 118 confines the primer charge 111 and the detonator charge 112, previously referred to—these latter charges being secured in place by an annular ring 122 before the body portion 118 is screwed into the adaptor 120. The upper end of the booster tube is covered by the thin disc 114 previously referred to which separates the booster charge from the detonator charge prior to ignition of the detonator.

A lower timing ring 124 is positioned beneath an upper timing ring 126 while both of these rings are fitted to the exterior cylindrical surface of the upper portion of the fuse body 118. The lower ring 124 is provided in its lower surface with a C-shaped powder groove 128 and with a passage 130 which intersects the C-shaped groove 128 and extends upwardly to the top surface of the ring. The upper ring 126 is similarly provided with a C-shaped groove 132 in its lower surface and with a passage 134 which extends from one end of the C-shaped passage 102 to a passage 100 leading to an annular recess 136 in the upper end of the fuse body 118. The passages 134, 132, 130, and 128 are filled with compressed powder having a relatively slow burning rate. Directly beneath the ring 124, the fuse body contains an additional passage 138, also filled with compressed powder which leads from the lower surface of the ring 124 to the priming charge 111 in the chamber 108.

An annular recess 140 in the lower face of the ring 124, together with the face of the fuse body 118 provides an annular chamber spaced inwardly of and coaxial with the groove 128. This chamber is connected with the passage 104 by a branch passage 142 closed at its inner end by a thin metal disc 144 secured in place by shellac. The annular space 140 also communicates through an upwardly extending passage 146 with a similar annular chamber 148 in the upper time ring 126. This upper chamber communicates through an upwardly extending passage 150 with an annular chamber 152 vented to the outside of the fuse through a plurality of passages 154. In a similar manner, a passage 156 connects the passage 134 with the annular space 152.

The annular space 152 and the outwardly radiating passages 154 are formed in a fuse cap 158 which is threaded to the upper end of the fuse body 118. This cap has a recess 160 formed therein in alignment with the recess 136 and at its upper end is provided with threads 162 to receive an end piece 164 which has a portion that extends inwardly into the recess 136 and is in turn provided with a cylindrical recess 166. At the lower end of this latter recess, threads are provided to permit attachment of a retainer ring 168 that secures a primer of the shot-gun head type 170 in place with the percussion cap of the shot-gun head centrally located at the lower end of the recess 166.

A firing pin 98 previously referred to is slidably mounted within the recess 166 and has its shank portion extended through a coil spring 172 which tends to urge the firing pin downwardly. The upper end of this firing pin extends through the end of the end piece 164 and has a split ring 174 connected thereto, while a cotter pin 176 extends through aligned openings in the end piece and the pin and prevents movement of the pin so long as this cotter pin is in place. After the bomb has been placed in its bomb rack, the key 176 is removed and may be replaced by the end of an arming wire which is withdrawn before release of the bomb.

As an added safety measure, the firing pin 98 is provided with an enlarged collar section 178 near its lower extremity which fits within a generally U-shaped spring metal retainer 180. The lower extremities of the legs of this member are bent sharply outwardly so that when these legs are slid into the recess 166, the ends of the legs impinge against the side walls of the recess and cause the legs to be sprung inwardly, thus forming a restriction in the recess beyond which the enlarged collar portion 178 cannot pass. To prevent the spring member 180 from turning within the recess, the ends of the springs are positioned in longitudinally extending channels 182.

When the bomb is released, the ring 176 is pulled outwardly, thus pulling the firing pin upwardly against the compression of the spring 172. This upward movement of the firing pin will cause upward movement of the spring member 180 until the ends of the spring member snap outwardly into openings 184 formed through the side walls of the end piece 164. After the ends of the spring have moved outwardly into the openings 184, the restriction within the recess 166 will have been removed and the spring 172 will be enabled to drive the firing pin against the cap in the end of the shot gun shell primer as soon as the ring 174 has pulled free of the firing pin.

The firing of the shot gun shell primer burns away a thin shellacked paper disc 186 in the passage 134 and ignites the compressed powder therein. This in turn ignites the compressed powder 102 within the C-shaped groove 132 and this compressed powder will burn until it reaches the passage 104. From here the flame progresses downwardly through the passage 104 and ignites the second compressed powder train 106 in the lower C-shaped groove 128 which burns until the compressed powder in the passage 138 is ignited. The powder in this latter passage burns inwardly and ignites the primer charge 111 which fires the detonator charge 112, thus detonating the booster charge 116 and the explosive charge within the bomb casing.

After the timing rings 124 and 126 have been formed and the powder has been compressed in the C-shaped grooves, this powder is covered by a thickness of onion skin paper 188 cemented in place. The upper surface of the lower ring 124 is covered by a layer of felt 190 cemented thereto which has an opening in alignment with the passage 130. A similar felt washer 192 covers the upper surface of the flange on the fuse body 118 against which the lower surface of the ring 124 rests. This latter washer similarly has an opening in alignment with the end of the passage 110. In assembling this bomb fuse, the upper ring 126 is fixed to the fuse body while the lower ring 124 can be revolved to determine the effective length of the powder timing train.

The bomb illustrated in Figs. 1, 2 and 3 is shown as being provided with a fuse which may be considered as identical to that shown in Fig. 5, excepting that it is not required to have the booster 116, the retaining ring 122 or the detonating charge 112, since when this fuse is used with the bomb shown in Fig. 1, it ignites a powder charge having a relatively slow rate of propagation that requires no booster for its ignition.

Figure 6:
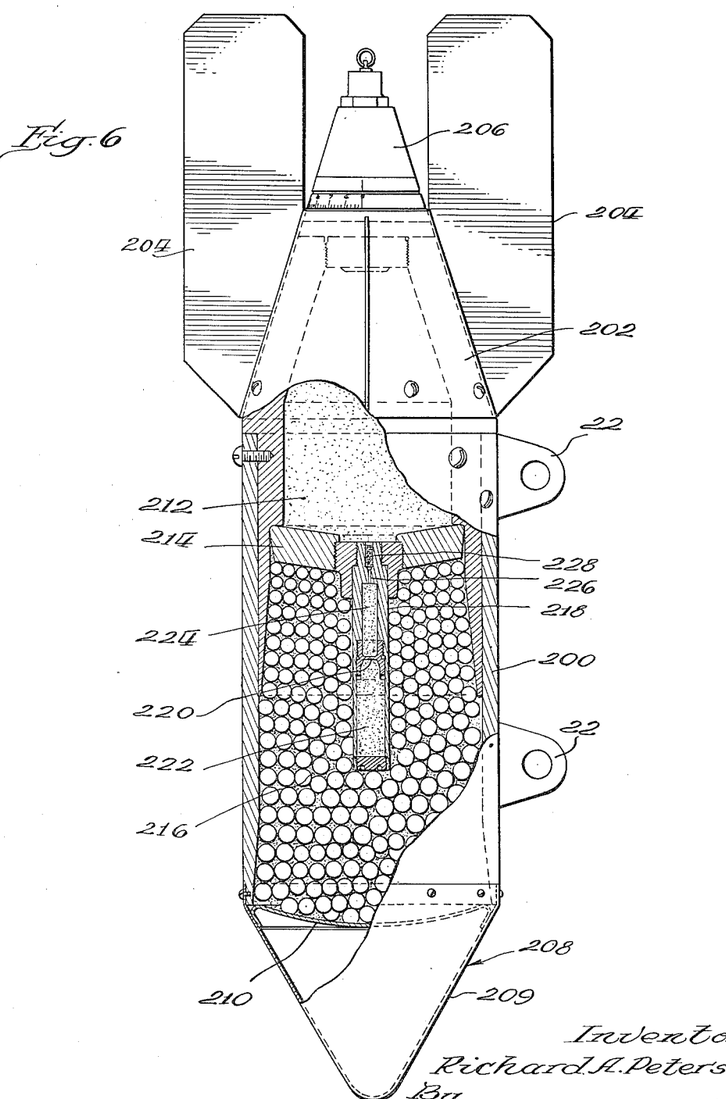
Fig. 6 is a time bomb intended for use against aircraft, personnel, and light ground objectives and illustrates a further modification of the present invention.

The shrapnel bomb shown in Fig. 6 may similarly be used for attacking aircraft. In operation, however, it differs somewhat from the bombs above described and will normally be timed so as to explode in a position above the aircraft being attacked. The present bomb includes a generally cylindrical bomb case 200, the upper portion of which is formed to provide a conical section 202 to which fins 204 and a fuse 206 are attached. The fuse may be considered as identical in construction to the fuse 24 shown in Fig. 1. The cylindrical body portion 200 is open at its lower end and after the bomb has been filled, this lower end is closed by a cap 208. This cap includes a generally conical nose portion 209 which aids the bomb's ballistic characteristics, and a diaphragm 210 that confines the charge within the bomb case.

The upper portion of the bomb case is filled with an explosive having a comparatively slow rate of propagation, such as gun powder 212; that is, this explosive should be of the propellant type. A comparatively heavy diaphragm 214 fits within the bomb case in a position beneath the powder charge 212 and serves to confine this powder and to separate the propellant explosive from a shrapnel charge 216 which fills the remainder of the bomb case. This shrapnel charge may consist either of a high explosive such as T. N. T. mixed with shrapnel pellets or, if preferred, it can consist of a centrally located container of high explosive surrounded by the shrapnel pellets confined in a matrix.

A gaine 218 is attached to the diaphragm 214 and extends well downwardly into the shrapnel and explosive charge 216. A diaphragm 220 threaded into the chamber of the gaine divides it into two separate compartments, the lower of which contains a booster charge 222, while the upper contains the detonator charge 224. This upper detonator charge is connected by means of a passage 226 with a chamber 228 containing a compressed powder pellet having a slow rate of propagation. The upper end of this compressed pellet is exposed to the powder charge 212 and is ignited therefrom.

The operation of the last above described bomb is instituted by dropping the bomb and by simultaneously actuating the time fuse 206 in a manner previously described in connection with the other embodiments of this invention. After a select predetermined time interval, the fuse 206 will ignite the black powder charge 212. The explosion of this powder charge will drive the diaphragm 214 downwardly, thus carrying the high explosive and shrapnel charge with it as it is expelled from the bomb case. During the expulsion of the shrapnel charge and the diaphragm 214, the sheet metal nose cap will be torn away. Simultaneously with the outward movement of the diaphragm and shrapnel charge, the compressed powder pellet 226 will be ignited and after a proper interval of time, this powder train will in turn ignite the detonator 224, the booster 222, and the high explosive with which the shrapnel is mixed.

It will be seen from the above described action of this bomb, that the shrapnel pellets will have not only a component away from the center of the explosion in all directions, but they will also have a downward component brought about by the forward velocity attained by the shrapnel and high explosive mass before detonation of the high explosive. The advantages of this arrangement are that the pellets will have a higher velocity, their direction in space can more accurately be controlled, and the danger of some of these pellets being blown upwardly against the aircraft dropping the bomb is eliminated.

If desired, this construction can be used with a relatively small explosive charge surrounded by the shrapnel pellets confined in a matrix. In fact, the charge in the gaine shown as a booster in Fig. 6 may be considered as the only exploding charge. If such a bomb is exploded, it will be appreciated that the principal velocity given to the pellets will be in a downward direction and that the explosive charge within the gaine will be enough merely to separate or scatter the pellets throughout the desired area. A bomb as thus constructed would have advantages in those instances where it is desired to confine the sheaf of pellets within a smaller zone than can be obtained by the ordinary shrapnel effect in which the principal velocity given to the pellets is that brought about by the charge which scatters the pellets in all directions from the center of the explosion. In other words, with a bomb of the type last described an effect similar to that obtained by a shot gun can be obtained if desired.

Figure 7:
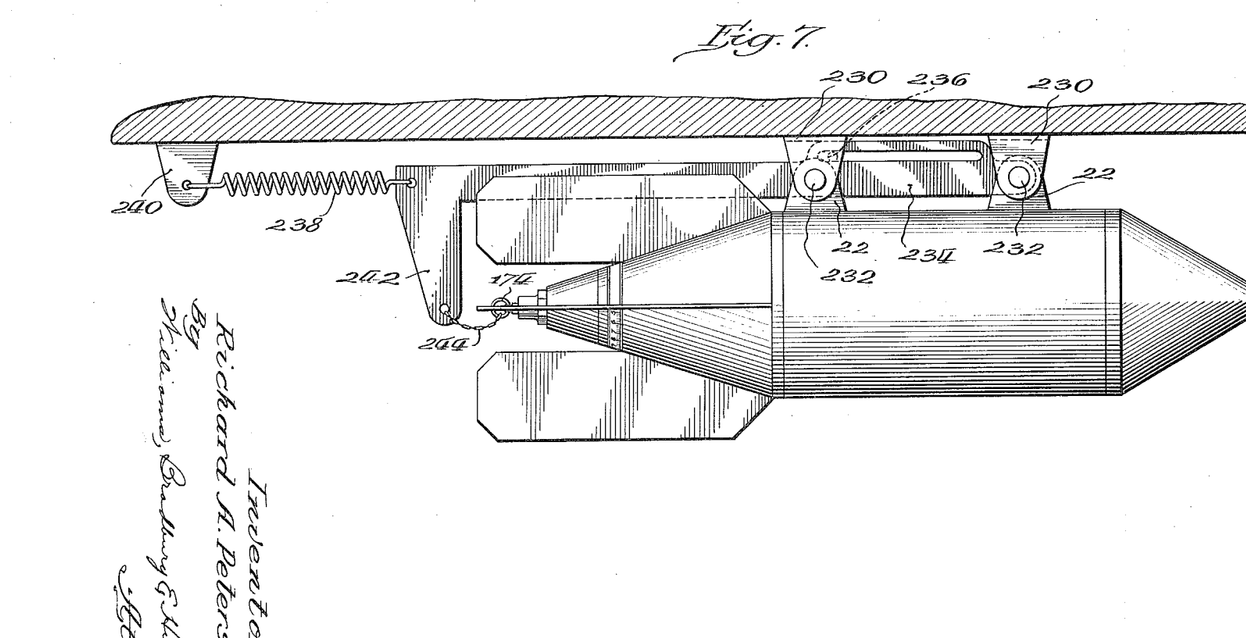
Fig. 7 illustrates a bomb secured in a bomb release embodying the present invention.

In Fig. 7, a bomb release rack adapted for use with time bombs of the type described is shown attached to what may be considered the lower surface of an aircraft wing or fuselage. If desired, of course, a bomb rack embodying the principles of this invention could be located within the aircraft fuselage and the bombs could be dropped through chutes or doors.

This bomb release rack is shown as comprising a pair of downwardly extending slotted lugs 230 attached to the lower surface of the wing or fuselage and so spaced that the lugs 22 on the bomb fit within the slots in the lugs 230. Transverse pins 232 extend through aligned apertures in these sets of lugs and prevent the bomb from moving relative to the aircraft wing. Release wires not shown are secured to the pins 232 so that when desired, these pins can be pulled from the lugs to permit the bomb to drop. The pins 232 also pass through aligned apertures in a slidable member 234, the longitudinal travel of which is limited by a pin 236 secured to the rearward lug 230 and extending transversely through a longitudinal slot in the member 234. The rearward end of the slidable member 234 is secured to one end of a coil spring 238, the other end of which is attached to an anchoring member 240 secured to the underside of the aircraft wing or fuselage. A downwardly extending portion 242 formed integrally with the slidable member 234 has its lower end positioned in alignment with the fuse ring 174 of the bomb secured to the rack. This fuse ring 174 is attached to one end of a chain 244, the opposite end of which is secured to the downwardly extending portion 242.

When the pins 232 are pulled, the bomb will be released and simultaneously the slidable member 234 will be freed of restraint and will be moved rearwardly under the influence of the spring 238. This rearward movement of the slidable member 234 acting through the chain 244 pulls outwardly on the ring 174, thus initiating action of the bomb fuse in a manner previously described.

Figure 8:
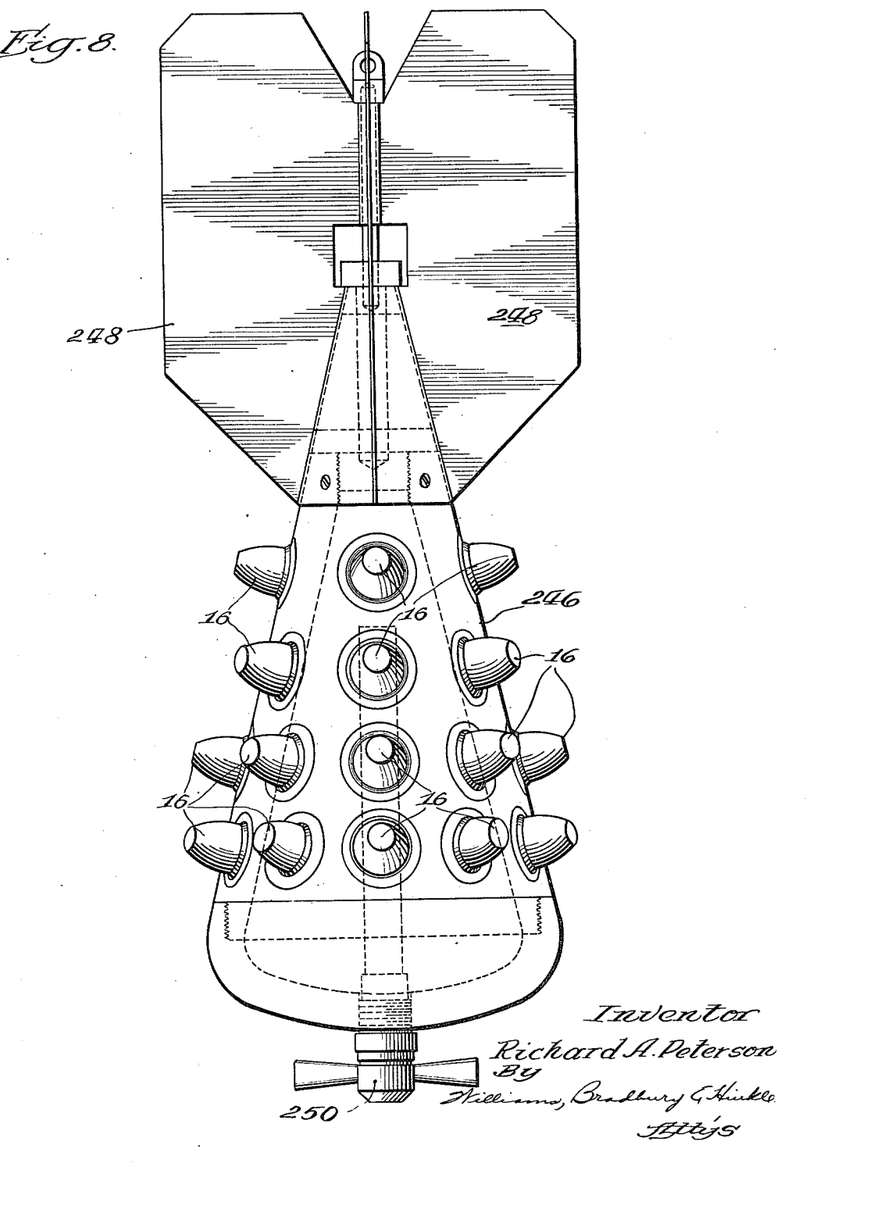
Fig. 8 is a side view of a bomb embodying a still further modification of the present invention. The bomb shown in Fig. 8 is particularly well adapted for use against personnel or light ground objectives of the type against which a fragmentation bomb is effective.

In Fig. 8 of the drawings, I have shown a bomb embodying some of the principles of my invention and which is particularly adapted for use against ground objectives. The bomb shown in Fig. 8 comprises a case 246 studded with explosive projectiles 16 identical to those shown in Fig. 3. At its rearward end the bomb is provided with the usual fins 248 which may be attached to the bomb case in any well-known manner, while at its forward end the bomb is fused with a standard nose fuse of the arming vane type 250. This fuse operates in a well-known manner and in the interest of simplifying this description, it may be considered as the standard War Department Mk. VII M1. fuse which is shown and described in detail in section XVI of the War Department booklet previously referred to. This nose fuse operates to detonate the bomb through the medium of a primer detonator and booster of the type previously described in conjunction with the bomb shown in Fig. 1.

The bomb case 246 is generally conical with the apex of the cone pointed upwardly. Thus, when the bomb strikes the ground surface and explodes, the projectiles 16 will be fired outwardly in a direction normal to the side walls of the bomb case and thus will explode in the air rather than being buried within the ground where they can do little or no damage. The action of these projectiles is exactly the same as that previously described in connection with the embodiments of this invention shown in Fig. 1 and Fig. 4 and, like the bomb shown in Figs. 1 and 4, the bomb shown in Fig. 8 can either have a single bomb case and a single explosive charge, such as that shown in Fig. 4, or it may have two explosive charges and two bomb cases in a manner similar to that shown in Fig. 1.

It will be seen that a bomb embodying the features of the present invention has advantages over bombs heretofore used and that the bombs shown and described as illustrative of the present invention carry out the objectives set forth at an earlier portion of this specification.

Having described my invention, what I claim as new and useful and desire to secure by Letters Patent of the United States is:

An aerial bomb for attacking aircraft in flight, comprising, an external frangible casing of generally streamlined shape and having fins attached thereto, a plurality of explosive projectiles secured to said casing and projecting therefrom in various directions, a timing fuse secured at the tail end of the external casing, an inner casing secured to the nose end of said external casing and spaced therefrom, a propellant charge for the projectiles packed in the space between said casings and arranged to be ignited by said time fuse, a high explosive charge within said inner casing, a detonator and booster charge for said high explosive charge, and a firing pin mechanism for said detonator comprising: a cylinder having one end thereof arranged to be subjected to the pressure generated by said propelling charge, a piston movable in the cylinder and carrying a firing pin, and yieldable means for holding said piston against movement, said means yielding to permit movement of the piston and firing pin when the piston is subjected to the pressure of the exploding propelling charge.

RICHARD A. PETERSON.

REFERENCES CITED

The following references are of record in the file of this patent:

UNITED STATES PATENTS

| Number | Name | Date |
|---|---|---|
| 1,289,483 | Leal | Dec. 31, 1918 |
| 1,511,622 | Lucas | Oct. 14, 1924 |
| 1,318,955 | Barlow | Oct. 14, 1919 |
| 2,303,034 | Emery | Nov. 24, 1924 |
| 2,190,374 | Bold et al. | Feb. 13, 1940 |
| 1,284,148 | Saladiner | Nov. 5, 1918 |
| 1,343,036 | Cook | June 8, 1920 |
| 1,737,833 | D'Orsaneo | Dec. 3, 1929 |

FOREIGN PATENTS

| Number | Country | Date |
|---|---|---|
| 300,668 | Italian | Sept. 15, 1932 |
| 100,255 | British | Nov. 8, 1917 |